(12) United States Patent
Pook et al.

(10) Patent No.: US 12,190,094 B2
(45) Date of Patent: Jan. 7, 2025

(54) COMPUTER-IMPLEMENTED METHOD FOR UPDATING A PROCESS CONTROL SYSTEM

(71) Applicant: ABB Schweiz AG, Baden (CH)

(72) Inventors: Stefan Pook, Minden (DE); Andreas Wahlmann, Meerbeck (DE); Andreas Stueckelmaier, Stolzenau (DE)

(73) Assignee: ABB Schweiz AG, Baden (CH)

( * ) Notice: Subject to any disclaimer, the term of this patent is extended or adjusted under 35 U.S.C. 154(b) by 128 days.

(21) Appl. No.: 17/845,340

(22) Filed: Jun. 21, 2022

(65) Prior Publication Data

US 2022/0405088 A1 Dec. 22, 2022

(30) Foreign Application Priority Data

Jun. 22, 2021 (EP) ...................... 21180887

(51) Int. Cl.
*G06F 8/65* (2018.01)
(52) U.S. Cl.
CPC ...................... *G06F 8/65* (2013.01)
(58) Field of Classification Search
CPC ........................................................ G06F 8/65
USPC ........................................................ 717/168
See application file for complete search history.

(56) References Cited

U.S. PATENT DOCUMENTS

| | | | | |
|---|---|---|---|---|
| 7,289,994 B2 * | 10/2007 | Nixon | ...................... | H04L 12/28 |
| 9,027,014 B2 * | 5/2015 | Asselin | ...................... | G06F 8/65 |
| | | | | 717/170 |
| 9,110,761 B2 * | 8/2015 | Nelson | ...................... | G06F 8/654 |
| 9,235,404 B2 * | 1/2016 | Cavalaris | ................ | G06F 8/654 |
| 9,491,049 B2 * | 11/2016 | Taylor | ...................... | H04L 67/34 |
| 9,491,071 B2 * | 11/2016 | Hart | .................... | H04L 43/0876 |

(Continued)

FOREIGN PATENT DOCUMENTS

| | | |
|---|---|---|
| EP | 2932382 | 10/2015 |
| EP | 2932382 B1 | 12/2020 |

(Continued)

OTHER PUBLICATIONS

Wikipedia, "Error message," Webpage downloaded from the Internet on May 24, 2022, at https://en.wikipedia.org/w/index.php?title=Error_message&oldid=1085328197, 5 pp. (2022).

(Continued)

*Primary Examiner* — Francisco J Aponte
(74) *Attorney, Agent, or Firm* — Leydig, Voit & Mayer, Ltd.

(57) ABSTRACT

A method for updating a process control system having a plurality of different hardware units includes providing a firmware data package, connecting a computing unit to an interface unit, transferring the firmware data package to the interface unit, providing current status data comprising information about the different hardware unit and information about the current firmware versions of the different hardware unit, checking whether the different hardware unit and the current firmware versions are compatible with the firmware update data for the different hardware units based on the current status data, and determining a checking result. When the checking result is positive, firmware update data in the different hardware unit is installed, and when the checking result is negative, an incompatibility message is provided.

18 Claims, 2 Drawing Sheets

(56) References Cited

U.S. PATENT DOCUMENTS

| | | | | |
|---|---|---|---|---|
| 9,507,585 | B2* | 11/2016 | Sotani | G06F 8/654 |
| 9,804,589 | B2* | 10/2017 | Pettus | G05B 19/4184 |
| 10,466,995 | B2* | 11/2019 | Sasaki | G05B 19/056 |
| 10,496,389 | B2* | 12/2019 | Stefan | G05B 19/042 |
| 11,301,236 | B2* | 4/2022 | Gorka | G06F 8/65 |
| 11,416,231 | B1* | 8/2022 | Malaspina | G06F 8/61 |
| 2006/0130073 | A1* | 6/2006 | Faist | G06F 8/65 |
| | | | | 719/321 |
| 2008/0046104 | A1* | 2/2008 | Van Camp | G05B 15/02 |
| | | | | 715/764 |
| 2008/0250403 | A1* | 10/2008 | Moon | G06F 8/65 |
| | | | | 717/169 |
| 2010/0235614 | A1* | 9/2010 | Callaghan | G05B 19/05 |
| | | | | 713/1 |
| 2014/0040875 | A1* | 2/2014 | Bower, III | G06F 8/65 |
| | | | | 717/170 |
| 2015/0317148 | A1* | 11/2015 | Ohashi | G06F 8/71 |
| | | | | 717/170 |
| 2015/0347124 | A1* | 12/2015 | Sotani | G06F 8/654 |
| | | | | 717/170 |
| 2016/0033941 | A1* | 2/2016 | T | G06F 8/65 |
| | | | | 700/81 |
| 2017/0357497 | A1* | 12/2017 | Lin | G06F 8/65 |
| 2018/0074483 | A1* | 3/2018 | Cruz | G05B 23/0283 |
| 2019/0227876 | A1* | 7/2019 | Dardis | G06F 8/71 |
| 2019/0317750 | A1 | 10/2019 | Ramsay et al. | |
| 2020/0174779 | A1 | 6/2020 | David et al. | |
| 2020/0228342 | A1* | 7/2020 | Nixon | H04L 9/0637 |
| 2020/0409690 | A1* | 12/2020 | Rouland | G06F 8/654 |
| 2022/0197530 | A1* | 6/2022 | Rhee | G06N 3/04 |
| 2023/0176845 | A1* | 6/2023 | Helms | G06F 8/65 |
| | | | | 717/168 |

FOREIGN PATENT DOCUMENTS

| | | | | | |
|---|---|---|---|---|---|
| JP | 2022109181 | A | * | 7/2022 | G06F 8/65 |
| KR | 20110104373 | A | * | 3/2010 | |
| WO | WO-2014058900 | A1 | * | 4/2014 | G05B 15/02 |

OTHER PUBLICATIONS

Wikipedia, "Downgrade," Webpage downloaded from the Internet on May 24, 2022, at https://en.wikipedia.org/w/index.php?title=Downgrade&oldid=I011789627, 1 pp. (2022).

European Patent Office, Extended European Search Report in European Application No. 21180887.8, 12 pp. (Dec. 10, 2021).

European Patent Office, Office Action in European Patent Application No. 21180887.8, 6 pp. (Jun. 24, 2024).

* cited by examiner

1

COMPUTER-IMPLEMENTED METHOD FOR UPDATING A PROCESS CONTROL SYSTEM

CROSS-REFERENCE TO RELATED APPLICATIONS

This patent application claims priority to European Patent Application No. 21180887.8, filed on Jun. 22, 2021, which is incorporated herein in its entirety by reference.

FIELD OF THE DISCLOSURE

The present disclosure relates to a computer-implemented method for updating a process control system, a device, a system, a use of a firmware data package in such a method and a computer program element.

BACKGROUND OF THE INVENTION

Process control systems are known from the state of the art. Process control systems comprise several different hardware units such as an I/O module, a power source, an interface unit and a control unit. Process control systems are used, in part, to control complex production plants, e.g. in process industry or automobile industry.

Within the scope of maintenance process control systems need to be checked, enhanced and/or adapted. This may lead to different technology stages within a process control system.

In view of this, it is found that a further need exists to provide a possibility to update a process control system.

BRIEF SUMMARY OF THE INVENTION

In one aspect, the present disclosure provides a possibility to update a process control system and, more particularly, provides an improved possibility to update a process control system.

According to a first aspect, a computer-implemented method for updating a process control system comprising different hardware units is provided, comprising the steps of providing a computing unit configured to provide a firmware data package comprising firmware update data for the different hardware units of the process control system comprising different hardware units; connecting the computing unit to an interface unit of the process control system; transferring the firmware data package from the computing unit to the interface unit; providing, by means of a checking unit, current status data comprising information about the different hardware units in the process control system and information about the current firmware versions of the different hardware units; checking, utilizing the checking unit, whether the different hardware units and the current firmware versions are compatible with the firmware update data for the different hardware units based on the current status data and determining a checking result; in case of a positive checking result, installing firmware update data on the different hardware units; in case of a negative checking result outputting of an incompatibility message.

BRIEF DESCRIPTION OF THE SEVERAL VIEWS OF THE DRAWING(S)

In the following, the present disclosure is described exemplarily with reference to the enclosed figures.

DETAILED DESCRIPTION OF THE INVENTION

Figure 1:
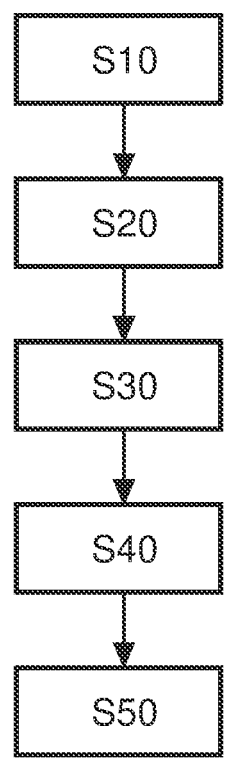
FIG. 1 is a schematic view for a method in accordance with a first embodiment of the present disclosure.

FIG. 1 shows a schematic view of a method according to a first embodiment.

The computer-implemented method is used for updating a process control system comprising different hardware units, comprising the following steps.

In a first step S10, a computing unit is provided configured to provide a firmware data package comprising firmware update data for the different hardware units of the process control system comprising different hardware units. The firmware data package may comprise different firmware files relating to respective hardware units, wherein the firmware files may comprise a firmware file header and at least one data field with the firmware update data. The firmware file header may comprise information of compatibility of the firmware file version to firmware file version and/or to other hardware units. The firmware data package may comprise a superior file header. The firmware data package may comprise signature data, wherein the signature data is preferably checked in relation of authenticity before the firmware data for the different hardware units is updated. The signature may be a code relating to an authorized version of the firmware data package, e.g. from manufacturer of the process control system. The firmware data package may comprise compatibility information data to which hardware units and firmware versions the firmware update data is compatible, wherein this compatibility information data is part of the firmware file header.

In step S20, the computing unit is connected to an interface unit of the process control system. It should be noted that step S10 and S20 may carried be out in a different order, i.e., step S20 may be carried out before or after step S10. In step S30 the firmware data package from the computing unit is transferred to the interface unit. In step S40 current status data comprising information about the different hardware units in the process control system and information about the current firmware versions of the different hardware units is provided by means of a checking unit. The current status data may further comprise firewall data of the process control system. In case a firewall in the process control system and/or in a single hardware unit is installed which may cause critical bug correction as a result of installing one or more firmware upgrades, the checking may reveal this and may output an incompatibility message. This may advantageously reduce downtimes.

In step S50, the checking unit can check or determine whether the different hardware units and the current firmware versions are compatible with the firmware update data for the different hardware units based on the current status data and determine a checking result. When the checking result is positive, which indicates that the different hardware units and the current firmware versions are compatible with the firmware update data for the different hardware units, the firmware update data for the different hardware units is installed. Similarly, when the checking result is negative indicating an incompatibility, the checking unit provides an appropriate message and the firmware update data is not installed. The method may further comprise the step of selecting, utilizing the computing unit, one or more firmware upgrades and/or downgrades, wherein, in one embodiment, the at least one data field of the firmware files also comprises firmware downgrade data comprising older versions of the firmware for the respective hardware unit. A user may select, utilizing the computing unit, one or more firmware upgrades and/or downgrades of a plurality of possible firmware upgrades and downgrades in which he is interested to install. This may increase the flexibility of the upgrade process as it may open a wider range of possibilities for upgrading the process control system. The method may further comprise the step of transferring firmware upgrade data and/or firmware downgrade data to the one or more hardware units. The method may further comprise an installing sequence for the order of installing the different firmware files on the different hardware units, preferably in dependency of a communication protocol of the different hardware units. The order of installing may advantageously allow to schedule first upgrading those hardware units with lowest communication protocol in order to avoid unnecessary restarts and disturbance during the updating of process control system.

Figure 2:
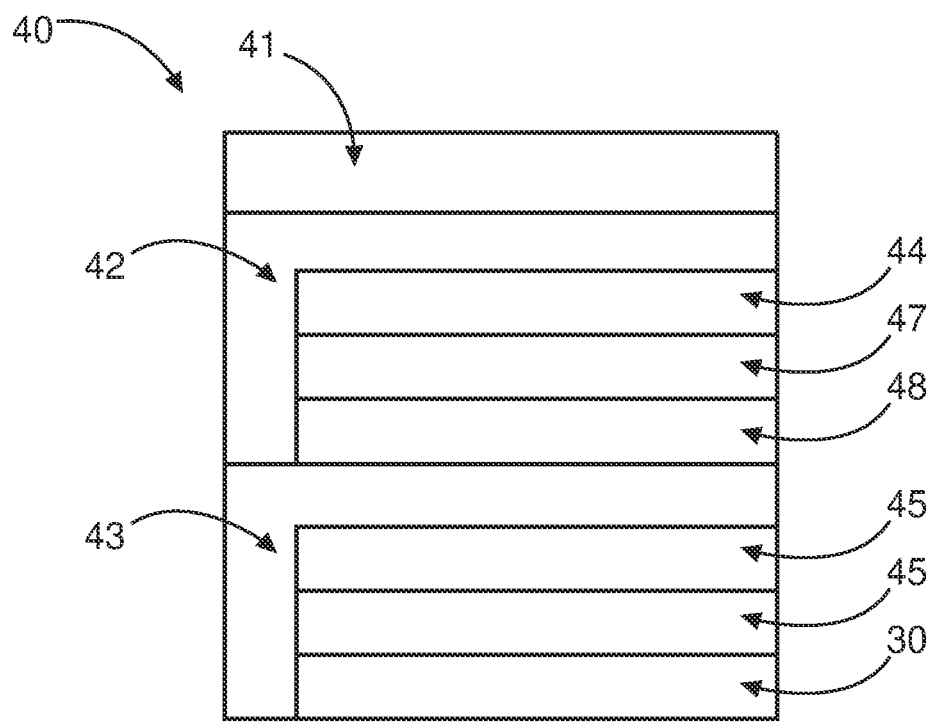
FIG. 2 is a schematic of a firmware data package in accordance with the disclosure.

FIG. 2 shows a schematic view of a firmware data package 40. The firmware data package comprises a super header 41, i.e. an overall header, comprising signature data. The signature data may preferably checked in relation of authenticity before the firmware data for the different hardware units is updated. In the present example, the firmware data package comprises two firmware files 42 and 43 for two different hardware units. The firmware data package comprises further for each firmware file a corresponding firmware file header 44 and 45. The firmware file header comprises compatibility information data to which hardware units and firmware versions the firmware update data is compatible. The firmware files 42 and 43 may comprise respectively two data fields 46, 47 and 48, 49 with the firmware update data.

Figure 3:
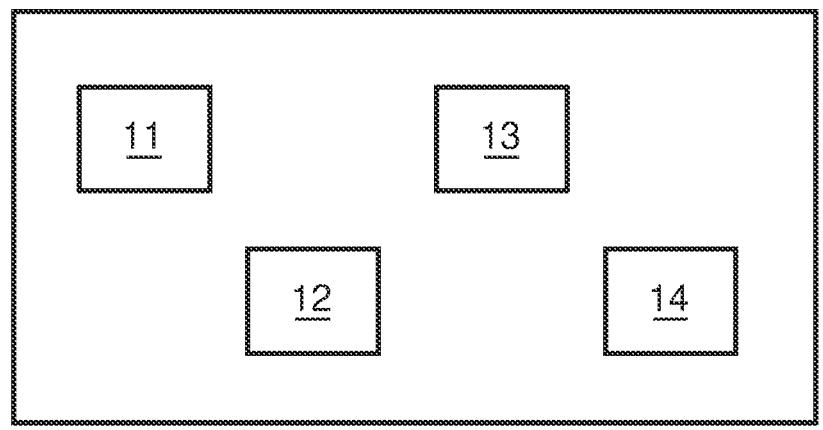
FIG. 3 is a schematic diagram of a device according to an embodiment of the present disclosure.

FIG. 3 shows a schematic view of device 10 according to an embodiment. The device, comprises a computing unit 11 configured to provide a firmware data package comprising firmware update data for the different hardware units of the process control system comprising different hardware units; a connecting unit 12 configured to connect the computing unit 11 to an interface unit of the process control system; a transferring unit 13 configured to transfer the firmware data package from the computing unit 11 to the interface unit; a checking unit 14 configured to provide current status data comprising information about the different hardware units in the process control system and information about the current firmware versions of the different hardware units; the checking unit 14 configured to check whether the different hardware units and the current firmware versions are compatible with the firmware update data for the different hardware units based on the current status data and to determine a checking result. As described above, in case of a positive checking result, firmware update data is installed in the different hardware units, and in case of a negative checking result, an incompatibility message is provided.

Figure 4:
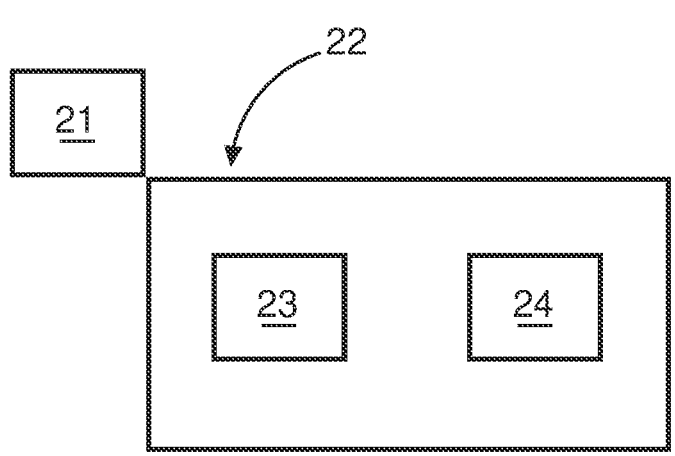
FIG. 4 is a schematic diagram of a system in accordance with an embodiment of the present disclosure.

FIG. 4 shows a schematic view of a system 20 according to an embodiment. The system comprises a device 21 (see FIG. 3) and a process control system 22 comprising two different hardware units 23 and 24. The hardware unit 23 is an I/O module. The hardware unit 24 is an interface unit, e.g. a fieldbus communication interface. The communication between the hardware units 23 and 24 and the device 21 is based on Ethernet.

The present disclosure has been described in conjunction with a preferred embodiment as examples as well. However, other variations can be understood and effected by those persons skilled in the art and practicing the claimed invention, from the studies of the drawings, this disclosure and the claims. Notably, in particular, the any steps presented can be performed in any order, i.e. the present invention is not limited to a specific order of these steps. Moreover, it is also not required that the different steps are performed at a certain place or at one node of a distributed system, i.e. each of the steps may be performed at a different nodes using different equipment/data processing units.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The term process control system, as used herein, is to be understood broadly and relates to expandable controller for controlling a process. The process control system may be an expandable PLC. The process control system may comprise different hardware units, such as an I/O module, a control unit, an interface unit, a signal transformation unit, a power source unit, a communication unit etc. The hardware units may communicate with each other by Ethernet, Fieldbus, HART etc. The communication may be wired and/or wireless. The hardware units may be mounted on a rack in control cabinet. The process control system may be connected with a field unit, e.g. sensor device, actuator device, pumps, etc. Each of the hardware units may have a different date of manufacturing and therefor may have a different software version, e.g. from different years. The term computing unit, as used herein, is to be understood broadly and relates to any controller configured to provide a firmware data package. The computing unit may be a plc, a microcontroller, a personal computer or a tablet. The term firmware data package, as used herein, is to be understood broadly and relates to firmware update data for two or more hardware units of a process control system. In general the firmware data package may contain firmware update data for the complete process control system. The firmware update data relates to a software upgrade for a specific hardware unit of the process control system. The term interface unit, as used herein, is to be understood broadly and relates to mechatronic hardware unit configured to provide a communication between itself and the computing unit. The interface unit may be a fieldbus communication interface. The fieldbus communication interface may be Ethernet based. The fieldbus communication interface may comprise built-in switches. The fieldbus communication interface may host up to 192 single channel granular signal conditioning modules (i.e. I/O module). The process control system may further comprise a generic I/O module which may handle the communication between Fieldbus Communication Interface (FCI) and the Signal Conditioning Modules (SCM). The generic I/O module may communicate upstream with the FCI using Modulebus, and downstream with up to 16 SCMs. The term checking unit, as used herein, is to be understood broadly and relates to any hardware unit and/or software unit configured to check or compare or to evaluate current status data of the hardware units with the firmware package data and to determine a compatibility result. The checking unit may be a plc, a microcontroller, or a virtual machine, or the like.

The embodiments described herein are premised on the finding that a process control system comprises different hardware units which may have different firmware versions. The process control system may be increased by adding additional functionality with further I/O modules. However this may lead to a need to perform a firmware upgrade, e.g. to add new functionality or to solve issues in existing functionality. By applying a comprehensive firmware update for such process control system new complexity may arise, as two different firmware version of one hardware unit may not be compatible to each other or to another hardware unit in the process control system. The invention solves this problem by checking the compatibility of firmware versions of the upgrade with current firmware version installed on the hardware units. This may be advantageous in terms of downtimes of the process control system and in the prevention of failures.

In an embodiment, the firmware data package may comprise different firmware files relating to respective hardware units, wherein the firmware files may comprise a firmware file header and at least one data field with the firmware update data. The firmware file header may comprise information of compatibility of the firmware file version to firmware file version and/or to other hardware units. The checking unit may read the firmware file header and may compare information of compatibility with current firmware installed in the hardware units. The checking unit may compare the firmware file header with the hardware unit itself as there may also occur incompatibility between firmware and hardware unit. The checking unit may further compare the firmware file with other firmware files installed on other hardware units than the corresponding hardware unit.

In an embodiment, the firmware data package may comprise signature data, wherein the signature data is preferably checked in relation of authenticity before the firmware data for the different hardware units is updated. The signature data may relate a firmware data package provided from an authorized source. The signature may be a code relating to an authorized version of the firmware data package, e.g. from manufacturer of the process control system. This may be advantageous in terms of security as no malware will be installed on the hardware units of process control system.

In an embodiment, the firmware data package may comprise compatibility information data to which hardware units and firmware versions the firmware update data is compatible, wherein this compatibility information data is part of the firmware file header.

In an embodiment, the method may further comprise the step selecting by means of the computing unit one or more firmware upgrades and/or downgrades, wherein preferably the at least one data field of the firmware files also comprises firmware downgrade data comprising older versions of the firmware for the respective hardware unit. A user may select by means of the computing unit one or more firmware upgrades and/or downgrades of a plurality of possible firmware upgrades and downgrades in which he is interested in to install. This may increase the flexibility of the upgrade process as it may open a wider range of possibilities for upgrading the process control system.

In an embodiment, the current status data may further comprise firewall data of the process control system. In case a firewall in the process control system and/or in a single hardware unit is installed which may cause critical bug correction as a result of installing one or more firmware upgrades, the checking may reveal this and may output an incompatibility message. This may advantageously reduce downtimes.

In an embodiment, the method may further comprise the step of transferring firmware upgrade data and/or firmware downgrade data to the one or more hardware units.

In an embodiment, the hardware unit may be an I/O module, a field bus communication interface, a safety module, or an Ethernet adapter.

In an embodiment, a communication within the process control system and to the process control system may be based on Ethernet, HART, Profibus, and/or Fieldbus.

In an embodiment, the method may further comprise an installing sequence for the order of installing the different firmware files on the different hardware units, preferably in dependency of a communication protocol of the different hardware units. The order of installing may advantageously allow to schedule first upgrading those hardware units with lowest communication protocol in order to avoid unnecessary restarts and disturbance during the updating of process control system.

A further aspect of the present disclosure relates to a device, comprising: a computing unit configured to provide a firmware data package comprising firmware update data for the different hardware units of the process control system comprising different hardware units; a connecting unit configured to connect the computing unit to an interface unit of the process control system; a transferring unit configured to transfer the firmware data package from the computing unit to the interface unit; a checking unit configured to provide current status data comprising information about the different hardware units in the process control system and information about the current firmware versions of the different hardware units; the checking unit configured to check whether the different hardware units and the current firmware versions are compatible with the firmware update data for the different hardware units based on the current status data and to determine a checking result, in case of a positive checking result, to install firmware update/upgrade data on the different hardware units, in case of a negative checking result, to output of an incompatibility message.

A further aspect relates to a system comprising: a device as described above; at least two different hardware units. The hardware unit may be an I/O module, a control unit, an interface unit, a signal transformation unit, a power source unit, a communication unit etc.

A further aspect relates to a use of a firmware data package in a method as described above, wherein the firmware data package comprises different firmware files relating to respective hardware units, wherein the firmware files comprise a firmware file header and at least one data field with the firmware update data.

A last aspect relates to a computer program element configured to carry out steps of a method as described above in a system as described above.

LIST OF REFERENCE SIGNS

S10 providing a computing unit
S20 connecting the computing unit to an interface unit
S30 transferring the firmware data package from the computing unit to the interface unit
S40 providing current status data
S50 checking
10, 21 device
11 computing unit
12 connecting unit 13 transferring unit
14 checking unit
20 system
22 process control system
23 I/O module
24 interface unit
40 firmware data package
41 super header
42, 43 firmware file
44, 45 firmware file header
46, 47, 48, 49 data fields The term "unit" as used herein, for example, in the context of a computing, connecting, transferring, or checking unit, is generically used in place of a programmable controller or computer device that includes some or most of electrical or electronic components, as is known in the art, including one or more processors, volatile and/or permanent memory, communication circuits, informational access to/from other units and/or databases, and the like. In some embodiments, the "units" may be implemented in hardware or software that is actual or exists in a virtual environment without regard on the functions of such units described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method for updating a process control system comprising a plurality of different hardware units, the method comprising:
   providing a computing unit configured to provide a firmware data package comprising firmware update data for the plurality of different hardware units of the process control system, wherein the firmware data package comprises different firmware files relating to respective hardware units of the plurality of hardware units and compatibility information data, wherein each of the firmware files comprises a firmware file header, and wherein the compatibility information data is part of the firmware file header and indicates first compatibilities between the firmware update data and current firmware versions of the plurality of different hardware units and second compatibilities between the firmware update data and the plurality of different hardware units themselves;
   connecting the computing unit to an interface unit of the process control system;
   transferring the firmware data package from the computing unit to the interface unit;
   providing, utilizing a checking unit, current status data comprising information about the plurality of different hardware units in the process control system and information about the current firmware versions of the plurality of different hardware units;
   checking, utilizing the checking unit, whether the plurality of different hardware units and the current firmware versions are compatible with the firmware update data for each of the plurality of different hardware units based on the current status data, the first compatibilities, and the second compatibilities;
   determining a checking result in the checking unit based on the checking, and:
   when the checking result is determined to be positive, which indicates a compatibility, installing the firmware update data in each of the plurality of different hardware units; or
   when the checking result is determined to be negative, which indicates an incompatibility, outputting an incompatibility message.

2. The method according to claim 1, wherein each of the different firmware files further comprises at least one data field with the firmware update data.

3. The method according to claim 1, wherein the firmware data package comprises signature data, and wherein the signature data is checked in relation of authenticity before the firmware files for the plurality of different hardware units are updated.

4. The method according to claim 1, further comprising selecting, utilizing the computing unit, at least one firmware upgrade and/or downgrade, wherein at least one data field of the firmware files also comprises firmware downgrade data comprising older versions of the firmware for at least one of the plurality of hardware units.

5. The method according to claim 1, wherein the current status data further comprises firewall data of the process control system.

6. The method according to claim 4, further comprising transferring the firmware upgrade data and/or the firmware downgrade data to one or more hardware units of the plurality of hardware units.

7. The method according to claim 1, wherein at least one hardware unit from the plurality of hardware units is one of an I/O module, a field bus communication interface, a safety module, and an Ethernet adapter.

8. The method according to claim 1, wherein a communication within the process control system and to the process control system is based on Ethernet, HART, Profibus, and/or Fieldbus.

9. The method according to claim 1, further comprising executing an installing sequence for an order of installing the different firmware files on each of the plurality of different hardware units.

10. The method according to claim 9, wherein the installing sequence depends on a communication protocol of the plurality of different hardware units.

11. A device, comprising:
a computing controller configured to provide a firmware data package comprising firmware update data for a plurality of different hardware units of a process control system, wherein the firmware data package comprises different firmware files relating to respective hardware units of the plurality of hardware units and compatibility information data, wherein each of the firmware files comprises a firmware file header, and wherein the compatibility information data is part of the firmware file header and indicates first compatibilities between the firmware update data and current firmware versions of the plurality of different hardware units and second compatibilities between the firmware update data and the plurality of different hardware units themselves;
a connecting controller disposed to connect the computing controller to an interface controller of the process control system;
a transferring controller disposed to transfer the firmware data package from the computing controller to the interface controller;
a checking controller configured to provide current status data comprising information about the plurality of different hardware units in the process control system and information about the current firmware versions of the plurality of different hardware units;
wherein the checking controller is configured to;
determine whether each hardware unit of the plurality of different hardware units and the current firmware versions are compatible with the firmware update data based on the current status data, the first compatibilities, and the second compatibilities; and
determine a checking result based on determining whether each hardware unit of the plurality of different hardware units and the current firmware versions are compatible with the firmware update data;
and wherein when the checking result is determined to be positive, install firmware update data on the plurality of different hardware units, or
when the checking result is determined to be negative, output an incompatibility message.

12. The device according to claim 11, wherein each of the different firmware files further comprises at least one data field with the firmware update data.

13. The device according to claim 11, wherein the firmware data package comprises signature data, and wherein the signature data is checked in relation of authenticity before the firmware files for the plurality of different hardware units are updated.

14. The device according to claim 11, wherein the computing controller is further configured to select at least one firmware upgrade and/or downgrade, and wherein at least one data field of the firmware files also comprises firmware downgrade data comprising older versions of the firmware for at least one of the plurality of hardware units.

15. The device according to claim 11, wherein the current status data further comprises firewall data of the process control system.

16. The device according to claim 14, wherein the transferring controller is further configured to transfer the firmware upgrade data and/or the firmware downgrade data to one or more hardware units of the plurality of hardware units.

17. The device according to claim 11, wherein at least one hardware unit from the plurality of hardware units is one of an I/O module, a field bus communication interface, a safety module, and an Ethernet adapter, and wherein a communication within the process control system and to the process control system is based on Ethernet, HART, Profibus, and/or Fieldbus.

18. The device according to claim 11, wherein the checking controller is further configured to initiate execution of an installing sequence for an order of installing the different firmware files on each of the plurality of different hardware units, wherein the installing sequence depends on a communication protocol of the plurality of different hardware units.

* * * * *